United States Patent
Park

(10) Patent No.: US 7,431,369 B2
(45) Date of Patent: Oct. 7, 2008

(54) VEHICLE GLOVE BOX HAVING A ROTARY-TYPE PARTITION

(75) Inventor: In-Heum Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 287 days.

(21) Appl. No.: 11/319,466

(22) Filed: Dec. 29, 2005

(65) Prior Publication Data

US 2007/0007787 A1    Jan. 11, 2007

(30) Foreign Application Priority Data

Jul. 5, 2005    (KR)    ............. 10-2005-0060478

(51) Int. Cl.
 *B60N 3/12* (2006.01)
(52) U.S. Cl. .................................... 296/37.8
(58) Field of Classification Search ............... 296/37.8, 296/37.1; 220/529, 530, 531, 532, 533, 544; 224/483, 277, 539; 16/319, 321, 322; 49/386
See application file for complete search history.

(56) References Cited

U.S. PATENT DOCUMENTS

| | | | |
|---|---|---|---|
| 2,226,434 A * | 12/1940 | Hirsh ...................... 312/334.5 |
| 4,660,880 A * | 4/1987 | Bensch, Walter D. ...... 296/37.1 |
| 4,944,544 A * | 7/1990 | Dick ......................... 296/37.1 |
| 5,074,777 A * | 12/1991 | Garner ....................... 425/289 |
| 5,273,310 A | 12/1993 | Terai |
| 5,385,378 A | 1/1995 | Hakamada et al. |
| 5,526,972 A * | 6/1996 | Frazier et al. ................ 224/539 |
| 5,584,412 A * | 12/1996 | Wang ......................... 220/500 |
| 5,626,380 A * | 5/1997 | Elson et al. ................. 296/39.1 |
| 5,823,598 A * | 10/1998 | Clare et al. ................. 296/37.6 |
| 6,231,099 B1 * | 5/2001 | Greenwald .................. 296/37.8 |
| 6,715,815 B2 * | 4/2004 | Toppani ................... 296/37.12 |
| 6,749,242 B2 | 6/2004 | Park |
| 6,899,364 B2 | 5/2005 | Park et al. |
| 6,966,593 B2 * | 11/2005 | Plentis et al. ............... 296/37.6 |
| 2003/0222473 A1 * | 12/2003 | Yamamoto et al. ......... 296/37.1 |
| 2005/0134070 A1 * | 6/2005 | Plentis et al. ............... 296/37.1 |
| 2005/0275146 A1 | 12/2005 | Shin |

* cited by examiner

*Primary Examiner*—H Gutman
(74) *Attorney, Agent, or Firm*—Greenblum & Bernstein, P.L.C.

(57) ABSTRACT

Disclosed herein is a vehicle glove box. The vehicle glove box has a rotary-type partition received to divide the interior of the glove box in a simplified manner. The rotary-type partition can be easily moved from its rest position to its operating position, or vice versa, with single manual operation.

10 Claims, 4 Drawing Sheets

VEHICLE GLOVE BOX HAVING A ROTARY-TYPE PARTITION

BACKGROUND OF THE INVENTION

1. Field of the Invention

The present invention relates to a vehicle glove box, and, more particularly, to a vehicle glove box in which a rotary-type partition is received to divide the interior of the glove box in a simplified manner while ensuring easy movement of the partition to its operating and rest positions.

2. Description of the Related Art

Conventionally, as shown in FIG. 1, a vehicle glove box includes a box body 10 having a predetermined interior space, and a locking handle 30 fixed to the front surface of the box body 10. The box body 10 is hinged, at lower ends of opposite lateral surfaces thereof, to a crash pad in a location close to a right lower end of the crash pad.

Specifically, the box body 10 of the conventional glove box is horizontally hinged to pivotally rotate upward or downward. Such a configuration is helpful to increase the space utility of a passenger compartment.

However, the conventional vehicle glove box has a problem in that items stored in the glove box tend to easily leave their positions and become mixed up while a vehicle is traveling, more particularly, in the case of vehicle cornering.

To solve the above problem, conventionally, a glove box having a partition 20 had been developed and used. To install the partition 20 in the box body 10, as shown in FIG. 2, the box body 10 is provided with a horizontal slender rod 11 having a constant diameter. Correspondingly, the partition 20 has a fitting hole 21 for the passage of the horizontal rod 11. The horizontal rod 11 is hinged at opposite ends thereof to the crash pad, and horizontally penetrates through the box body 10. When the horizontal rod 11 is inserted through the fitting hole 21 of the partition 20, the horizontal rod 11 serves to guide the sliding movement of the partition 20. Through the use of both the horizontal rod 11 and the partition 20, the interior space of the box body 10 is divided in a desired manner.

The box body 10 of the conventional glove box is further provided with a plurality of fixing recesses 12. Correspondingly, the partition 20 has a holding protrusion 22 configured to be selectively inserted into any one of the fixing recesses 12. The fixing recesses 12 are equidistantly arranged in the longitudinal direction of the box body 10 along the lower end of the front surface of the box body 10. If the holding protrusion 22 of the partition 20 is caught by one of the fixing recesses 12, the partition 20 stops a sliding motion thereof and is fixed at a location on the horizontal rod 11 of the box body 10. As a result, the interior space of the box body 10 is divided into two parts each having a desired volume.

The partition 20 is formed, at a rear upper end thereof, with the fitting hole 21 so that the horizontal rod 11 of the box body 10 penetrates therethrough. With the use of the fitting hole 21, the partition 20 is adapted to be horizontally fitted to the rod 11 of the box body 10 in an upstanding state. Thereby, the partition 20 is able to longitudinally slide along the horizontal rod 11 within the interior space of the box body 10.

Also, the partition 20 is formed at a front lower end thereof with the holding protrusion 22 so that the holding protrusion 22 is caught by one of the corresponding fixing recesses 12. Thereby, if the holding protrusion 22 is selectively inserted into any one of the plurality of fixing recesses 12, the partition 20 is able to be fixed at a desired position.

However, the conventional glove box having the above-described partition has a problem in that the installation/removal of the partition is difficult. To install the partition at a desired position, the partition should be repeatedly fit into or released from the fixing recesses 12 one by one while being slid along the horizontal rod. Thus, the partition can reach the desired position only after completing many troublesome manual operations.

Furthermore, the holding protrusion of the conventional partition tends to be easily separated from the fixing recess due to vibrations generated while the vehicle is traveling, thereby causing an unintentional separation of the partition. The separated partition makes noise by collision of the items placed in the box body, and may cause damage to those items.

SUMMARY OF THE INVENTION

Therefore, the present invention has been made in view of the above problems, and it is an object of the present invention to provide a vehicle glove box in which a rotary-type partition is received in a body of the glove box, so that the partition is easily movable to its operating and rest positions and is stably secured so as not to move in the box body after reaching the operating and rest positions, thereby preventing not only the generation of noise while the vehicle is traveling, but also damage to items placed in the box body.

In accordance with an aspect of the present invention, the above and other objects can be accomplished by the provision of a vehicle glove box having a rotary-type partition comprising: a box body internally defining a predetermined space, the box body being mounted in an instrument panel protruding out of the instrument panel in accordance with manual operation; the partition having a first end rotatably hinged to an inner location of the box body; and a pair of clamp devices mounted to the box body at locations corresponding to a second end of the partition when the partition reaches its operating and rest positions, respectively, to alternately maintain the partition at the operating or rest position.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment according to the present invention will be described with reference to the accompanying drawings.

Figure 1:
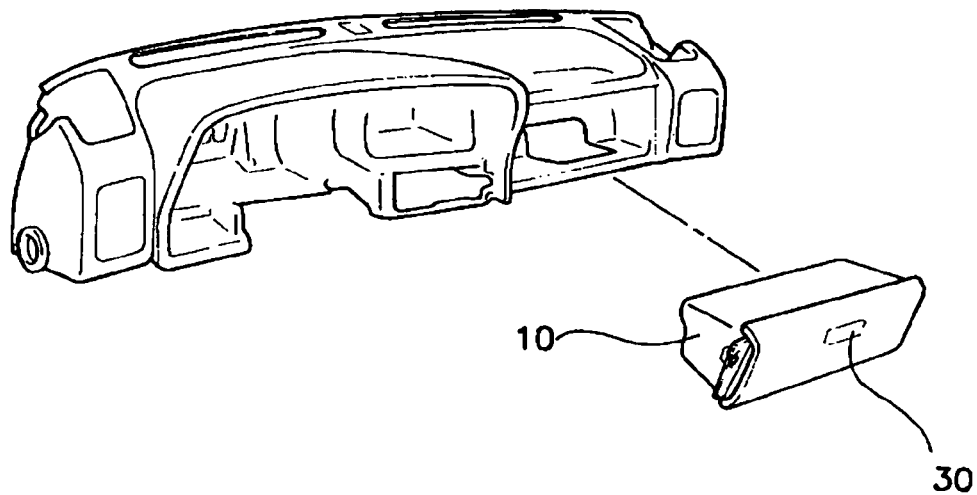
FIG. 1 is an exploded perspective view illustrating a conventional vehicle glove box.
Figure 2:
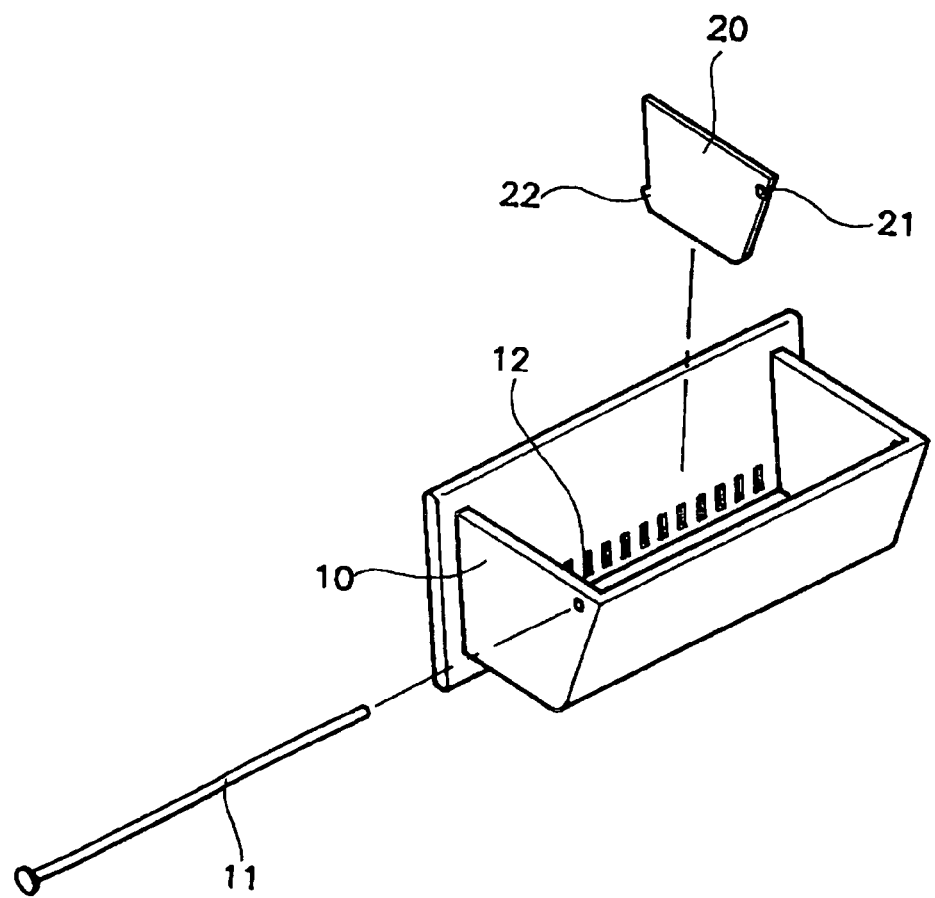
FIG. 2 is an exploded perspective view of the conventional vehicle glove box having a partition.
Figure 3:
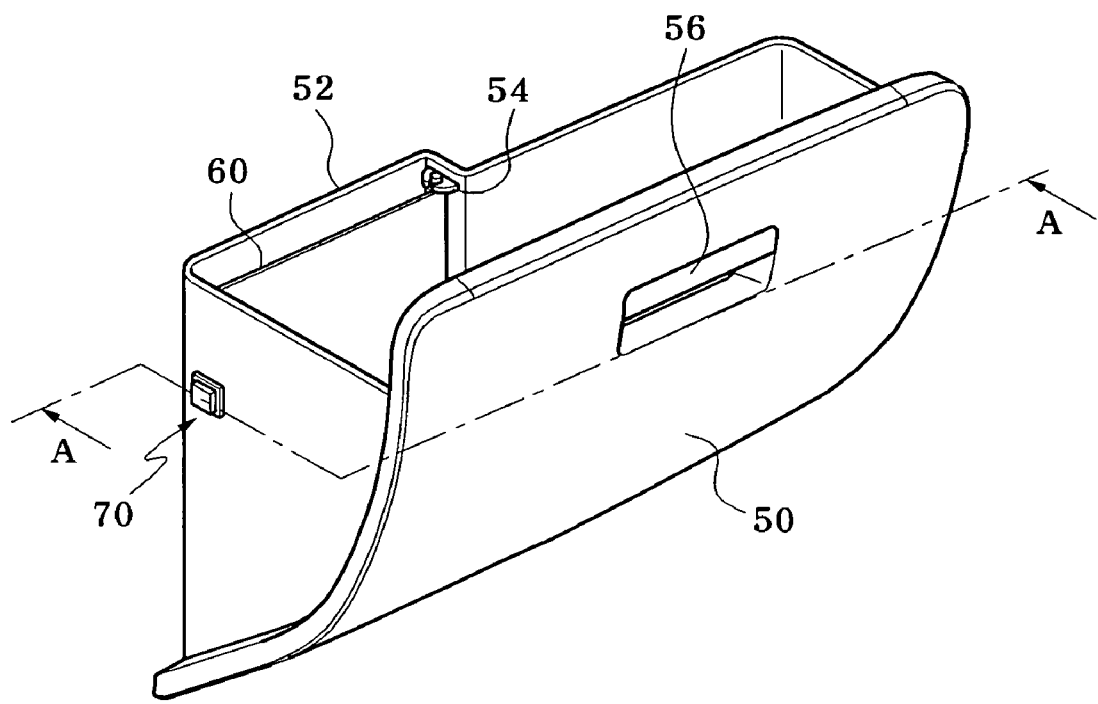
FIG. 3 is a perspective view illustrating a vehicle glove box having a rotary-type partition in accordance with the present invention.
Figure 4:
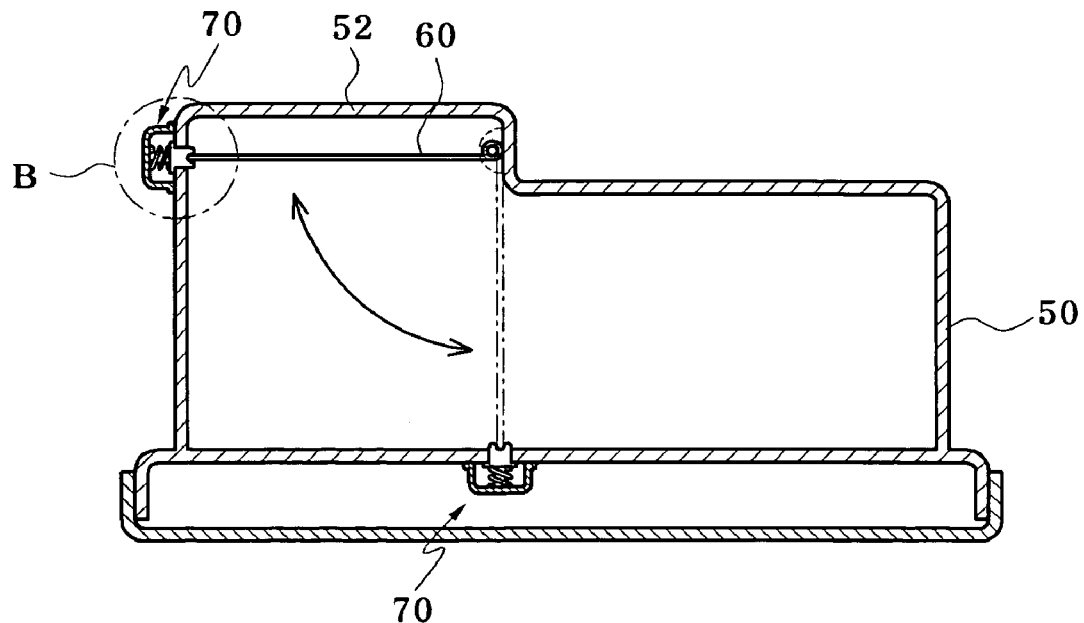
FIG. 4 is a plan sectional view taken along line A-A of FIG. 3.

FIG. 3 is a perspective view illustrating a glove box having a rotary-type partition in accordance with the present invention. FIG. 4 is a plan sectional view taken along line A-A of FIG. 3.

As shown in FIGS. 3 and 4, the vehicle glove box comprises a box body 50 having a predetermined interior space. The box body 50 is mounted in a vehicle instrument panel to protrude out of the instrument panel in accordance with manual operation. In accordance with the present invention, the vehicle glove box further comprises: a partition 60 having one end rotatably hinged to an inner location of the box body 50; and a pair of clamp devices 70 mounted to the box body 50. The installation positions of the pair of clamp devices 70 are determined so that each of the clamp devices 70 corresponds to the other end of the partition 60 when the partition 60 reaches an operating position or a rest position thereof.

Figure 5:
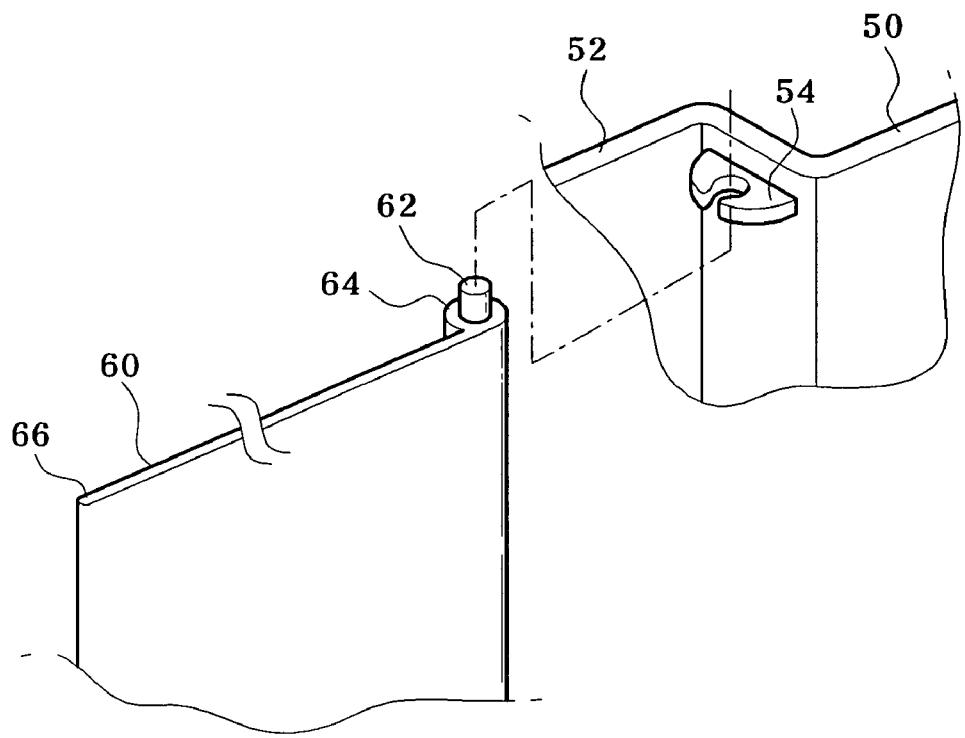
FIG. 5 is an exploded perspective view illustrating a mounting structure for the rotary-type partition of the glove box in accordance with the present invention.

Specifically, the box body 50 of the vehicle glove box according to the present invention has a partition receiving chamber 52 formed by outwardly bending part of a rear surface of the box body 50. As shown in FIG. 5, the receiving chamber 52 is provided with a pair of upper and lower holders 54. The upper and lower holders 54 are attached to an inner wall surface of the receiving chamber 52 located at the center of the box body 50, and serve to rotatably support one end of the partition 60. Thereby, the partition 60 is pivotally rotated about the upper and lower holders 54, so that the partition 60 is movable to its rest position wherein the partition 60 is received in the receiving chamber 52 or its operating position wherein the partition 60 is protruded out of the receiving chamber 52 in accordance with manual operation.

The partition 60 of the present invention has a panel shape. As shown in FIG. 5, the partition 60 has a pair of upper and lower rotating shafts 62 corresponding to the upper and lower holders 54. The partition 60 further has an eccentric portion 64 formed at the end thereof corresponding to the holders 54. The eccentric portion 64 is a cylindrical rod integrally formed along the end of the partition 60 to protrude into the receiving chamber 52 by a predetermined diameter. The pair of rotating shafts 62 is inserted into upper and lower ends of the eccentric portion 64, respectively. With this configuration, if the partition 60 is rotated to be received in the receiving chamber 52, the partition 60 is aligned with the rear surface of the box body 50, thereby forming part of an inner wall surface of the box body 50. In this case, since the rotating shafts 62 are located inside the receiving chamber 52 through the use of the eccentric portion 64, the partition 60 is leveled with the rear surface of the box body 50.

The other end of the partition 60, which corresponds to each of the clamp devices 70, is provided with a rounded end surface 66. The rounded end surface 66 is easily seated in a holding piece 74 of each of the clamp devices 70 when the partition 60 is rotated into the receiving chamber 52 or is rotated toward the center of the box body 50. Thus, the rounded end surface 66 enables easy manual operation of the partition 60.

Figure 6:
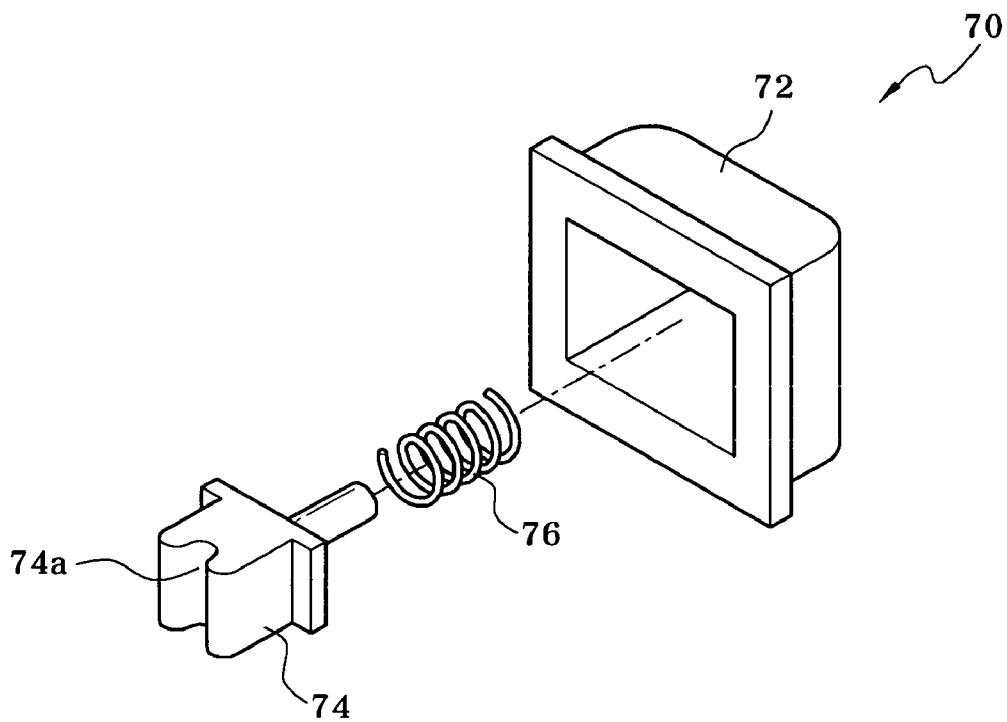
FIG. 6 is an exploded perspective view illustrating a clamp device for use in the glove box having the rotary-type partition in accordance with the present invention.

Referring to FIG. 6, each of the clamp devices 70 includes a cap 72, which is mounted at an outer wall surface of the box body 50 to correspond to the other end of the partition 60 when the partition 60 reaches its operating position or rest position. The cap 72 internally defines a predetermined space connected with the interior of the box body 50. The holding piece 74 of the clamp device 70 is received in the cap 72 to be pushed into the box body 50 upon receiving an external force. The clamp device 70 further includes a spring 76 interposed between the holding piece 74 and an inner wall surface of the cap 72.

The holding piece 74 has a pair of flange portions formed at opposite edges thereof to be caught by the outer surface of the body 50. An end of the holding piece 74 protrudes into the box body 50 and is centrally formed with a curved recess 74a. Thereby, if the partition 60 is manually rotated to be received in the receiving chamber 52 or is manually rotated toward the center of the box body 50, the rounded end surface 66 of the partition 60 is inserted into the recess 74a of the holding piece 74 of one of the clamp devices 70. With such an insertion of the rounded end surface 66, the spring 76 is compressed, thereby allowing the holding piece 74 to move into the cap 72. As a result, the rounded end surface 66 of the partition 60 can be stably seated in the recess 74a of the holding piece 74.

After the rounded end surface 66 is seated in the recess 74a, the holding piece 74 is again pushed into the box body 50 by the elasticity of the spring 76, thereby acting to press the partition 60. This has the effect of securing the partition 60 at a fixed position, thereby effectively preventing the partition 60 from being separated from the corresponding clamp device 70 by vibrations generated while the vehicle is traveling.

Now, the operation of the vehicle glove box having the rotary-type partition according to the present invention will be explained.

First, a locking handle 56 of the glove box is manually operated to open the box body 50, and then, items are put into the opened box body 50. When it is desired to put a relatively large item into the box body 50, the partition 60 is maintained at a rest position thereof wherein the partition 60 is received in the receiving chamber 52 as shown in FIG. 4, to provide an interior space sufficient to receive the item. In the rest position thereof, the partition 60 is coupled to one of the clamp devices 70, i.e. the left clamp device of FIG. 4.

Figure 7:
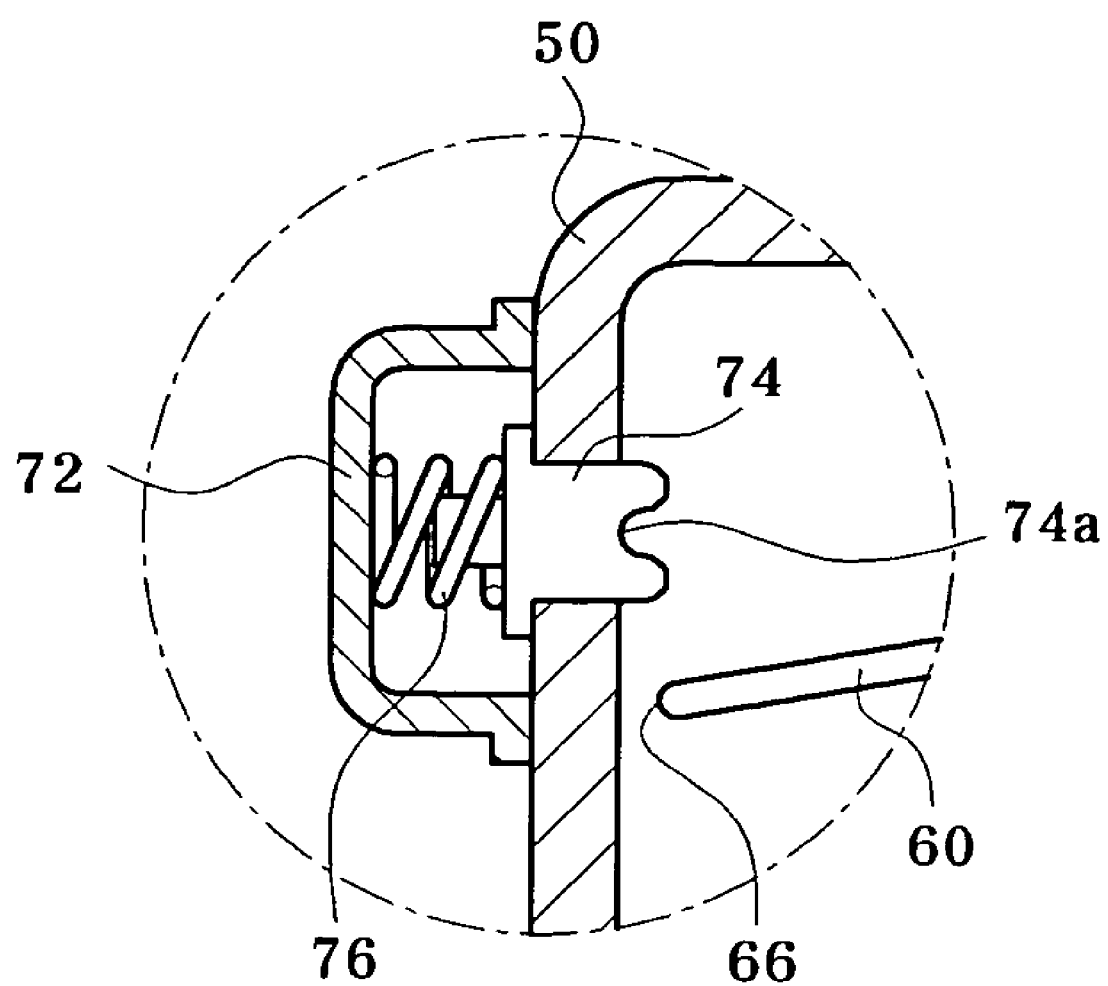
FIG. 7 is an enlarged sectional view of circle B of FIG. 4, illustrating the clamp device for use in the glove box having the rotary-type partition in accordance with the present invention.

On the other hand, when a relatively small item is put into the box body 50, the partition 60 has to be manually rotated toward the center of the box body 50. Specifically, if the partition 60 is forced to rotate from its rest position to its operating position, the rounded end surface 66 of the partition 60, which is coupled to the left clamp device 70, presses the holding piece 74 of the clamp device 70 while sliding along the recess 74a. With such a pressing operation, the spring 76 is compressed, thereby allowing the rounded end surface 66 of the partition 60 to be separated from the recess 74a of the holding piece 74. Thereby, the partition 60 is released from the left clamp device 70, so that it is rotatable toward the center of the box body 50, as shown in FIG. 7.

Subsequently, if the partition 60 is continuously rotated toward the center of the box body 50, the rounded end surface 66 of the partition 60 reaches the other clamp device 70 which is mounted at the center of the box body 50, thereby being securely seated in the holding piece 74 of the clamp device 70, to install the partition 60 at its operating position. After that, the seated rounded end surface 66 of the partition 60 presses the holding piece 74 into the cap 72 while sliding along the recess 74a With such a pressing operation, the spring 76 is compressed, thereby allowing the rounded end surface 66 to be securely seated in the recess 74a of the holding piece 74.

As will be easily understood, the partition 60 can be simply returned to its resting position by performing the above described installation procedure in reverse. In accordance with the present invention, the partition 60 can be easily moved from the operating position to the rest position, or vice versa via single manual operation. Also, the moved partition 60 can be stably maintained at its operating and rest positions by the use of a pair of clamp devices 70, without the risk of unintentional rotation and movement.

As apparent from the above description, the present invention provides a vehicle glove box having a rotary-type partition and a pair of clamp devices. When not in use, the partition is maintained at its rest position wherein the partition is rotatably received in a receiving chamber defined in a box body while being securely fixed by the use of a clamp device. After that, when it is desired to divide the interior of the box body, the partition can be easily rotated to its operating position with single manual operation and can be securely fixed at the rotated position by the use of another clamp device.

With the use of the pair of the clamp devices, each including a holding piece, a spring, and a cap, it is possible to completely prevent unintentional release of the partition, which is maintained at its operating or rest position, even from vibrations generated while the vehicle is traveling. This has the effect of enabling quiet vehicle travel without the generation of noise from inside the glove box and of preventing damage to items placed in the box body due to the collision with the inner wall surface of the box body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle glove box having a rotary-type partition comprising:
    a box body internally defining a predetermined space, the box body being mountable in an instrument panel to protrude out of the instrument panel;
    a partition having a first end rotatably hinged at an inner location of the box body; and
    clamp devices mounted to the box body at locations corresponding to a second end of the partition when the partition reaches operating and rest positions, respectively, to alternately maintain the partition at the operating or rest positions,
    wherein the box body has a partition receiving chamber formed to extend outwardly from the box body.

2. The vehicle glove box as set forth in claim 1, wherein the second end of the partition, corresponding to a respective one of the clamp devices, is provided with a rounded end surface.

3. The vehicle glove box as set forth in claim 1, wherein each of the clamp devices includes:
    a cap mounted at an outer wall surface of the box body to correspond to the second end of the partition when the partition reaches the operating or rest position, the cap internally defining a predetermined space connected with the interior of the box body;
    a holding piece received in the cap and extendible into the box body; and
    a spring interposed between the holding piece and an inner wall surface of the cap.

4. The vehicle glove box as set forth in claim 3, wherein the holding piece comprises:
    a pair of flange portions formed at opposite edges thereof to be retained by an outer surface of the box body; and
    a curved recess formed at an end of the holding piece protruding into the box body.

5. A vehicle glove box having a rotary-type partition comprising:
    a box body internally defining a predetermined space, the box body being mountable in an instrument panel to protrude out of the instrument panel;
    a partition having a first end rotatably hinged at an inner location of the box body; and
    clamp devices mounted to the box body at locations corresponding to a second end of the partition when the partition reaches operating and rest positions, respectively, to alternately maintain the partition at the operating or rest position,
    wherein the box body has a partition receiving chamber is formed by outwardly extending a portion of a rear surface of the box body.

6. The vehicle glove box as set forth in claim 5, wherein the receiving chamber is provided with holders, the holders being attached to an inner wall surface of the receiving chamber located at the center of the box body to rotatably support the partition.

7. The vehicle glove box as set forth in claim 5, wherein the partition has rotating shafts that correspond to the holders formed at the box body, respectively.

8. The vehicle glove box as set forth in claim 5, wherein the partition has an eccentric portion formed at the first end thereof corresponding to holders that protrude into the receiving chamber, and a pair of rotating shafts provided on respective upper and lower ends of the eccentric portion.

9. A vehicle glove box having a rotary-type partition comprising:
    a box body internally defining a predetermined space, the box body being mountable in an instrument panel to protrude out of the instrument panel;
    a partition having a first end rotatably hinged at an inner location of the box body; and
    clamp devices mounted to the box body at locations corresponding to a second end of the partition when the partition reaches operating and rest positions, respectively, to alternately maintain the partition at the operating or rest position,
    wherein each of the clamp devices includes:
    a cap mounted at an outer wall surface of the box body to correspond to the second end of the partition when the partition reaches the operating or rest position, the cap internally defining a predetermined space connected with the interior of the box body;
    a holding piece received in the cap and extendible into the box body; and
    a spring interposed between the holding piece and an inner wall surface of the cap.

10. The vehicle glove box as set forth in claim 9, wherein the holding piece comprises:
    a pair of flange portions formed at opposite edges thereof to be retained by an outer surface of the box body; and
    a curved recess formed at an end of the holding piece protruding into the box body.

* * * * *